(12) United States Patent
Isomura et al.

(10) Patent No.: US 10,790,552 B2
(45) Date of Patent: Sep. 29, 2020

(54) BATTERY SYSTEM AND CAPACITY RECOVERY METHOD FOR LITHIUM ION SECONDARY BATTERY

(71) Applicant: TOYOTA JIDOSHA KABUSHIKI KAISHA, Toyota-shi, Aichi-ken (JP)

(72) Inventors: Keisuke Isomura, Kariya (JP); Akira Kano, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 45 days.

(21) Appl. No.: 16/214,279

(22) Filed: Dec. 10, 2018

(65) Prior Publication Data

US 2019/0190089 A1    Jun. 20, 2019

(30) Foreign Application Priority Data

Dec. 14, 2017  (JP) ................. 2017-239400

(51) Int. Cl.
| | | |
|---|---|---|
| *H01M 10/48* | (2006.01) | |
| *H01M 10/44* | (2006.01) | |
| *H01M 10/42* | (2006.01) | |
| *H01M 10/46* | (2006.01) | |
| *H01M 10/0585* | (2010.01) | |
| *H01M 4/13* | (2010.01) | |
| *H01M 10/0525* | (2010.01) | |

(52) U.S. Cl.
CPC ............. *H01M 10/48* (2013.01); *H01M 4/13* (2013.01); *H01M 10/0525* (2013.01); *H01M 10/0585* (2013.01); *H01M 10/425* (2013.01); *H01M 10/4242* (2013.01); *H01M 10/44* (2013.01); *H01M 10/46* (2013.01)

(58) Field of Classification Search
None
See application file for complete search history.

(56) References Cited

U.S. PATENT DOCUMENTS

| | | | | |
|---|---|---|---|---|
| 2009/0251103 A1* | 10/2009 | Yamamoto | .............. | B60L 58/24 320/133 |
| 2010/0131217 A1* | 5/2010 | Ichikawa | ........... | G01R 31/3828 702/63 |
| 2011/0193529 A1* | 8/2011 | Nishimura | ............ | H01M 10/48 320/134 |
| 2017/0047569 A1* | 2/2017 | Saka | ................ | H01M 10/4235 |
| 2018/0151926 A1* | 5/2018 | Takebayashi | ....... | H01M 10/486 |

FOREIGN PATENT DOCUMENTS

| | | |
|---|---|---|
| JP | 2011-008963 A | 1/2011 |
| JP | 2015-187938 A | 10/2015 |
| JP | 2017-37734 A | 2/2017 |
| JP | 2017-45621 A | 3/2017 |

\* cited by examiner

*Primary Examiner* — Rena Dye Cronin
(74) *Attorney, Agent, or Firm* — Sughrue Mion, PLLC

(57) ABSTRACT

An ECU controls a PCU to perform capacity recovery control of recovering a capacity of an assembled battery. The capacity recovery control includes a discharge mode and a capacity recovery mode. In the discharge mode, the ECU discharges the assembled battery to a predetermined overdischarge region. In the capacity recovery mode, the ECU repeatedly performs, in the overdischarge region, a voltage increase of increasing a voltage across a lithium ion secondary battery due to a stop of the discharging and a pulse discharge of discharging the lithium ion secondary battery while oscillating a discharge current.

6 Claims, 10 Drawing Sheets

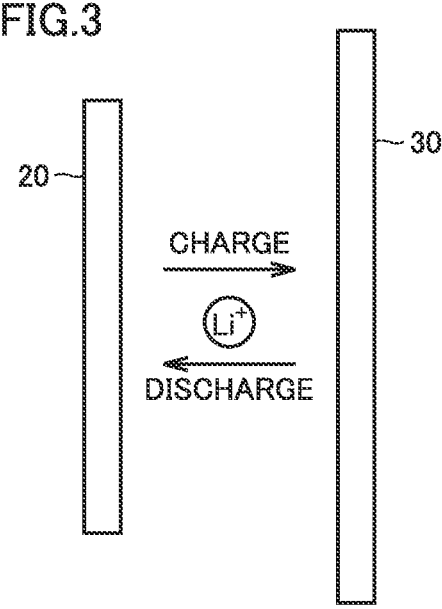
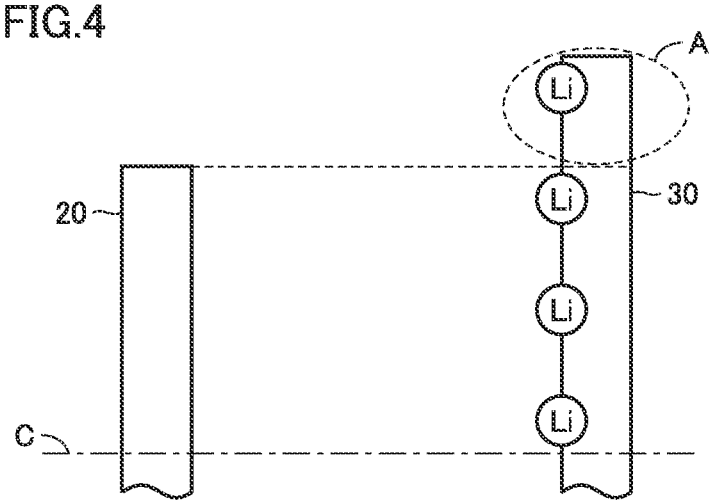

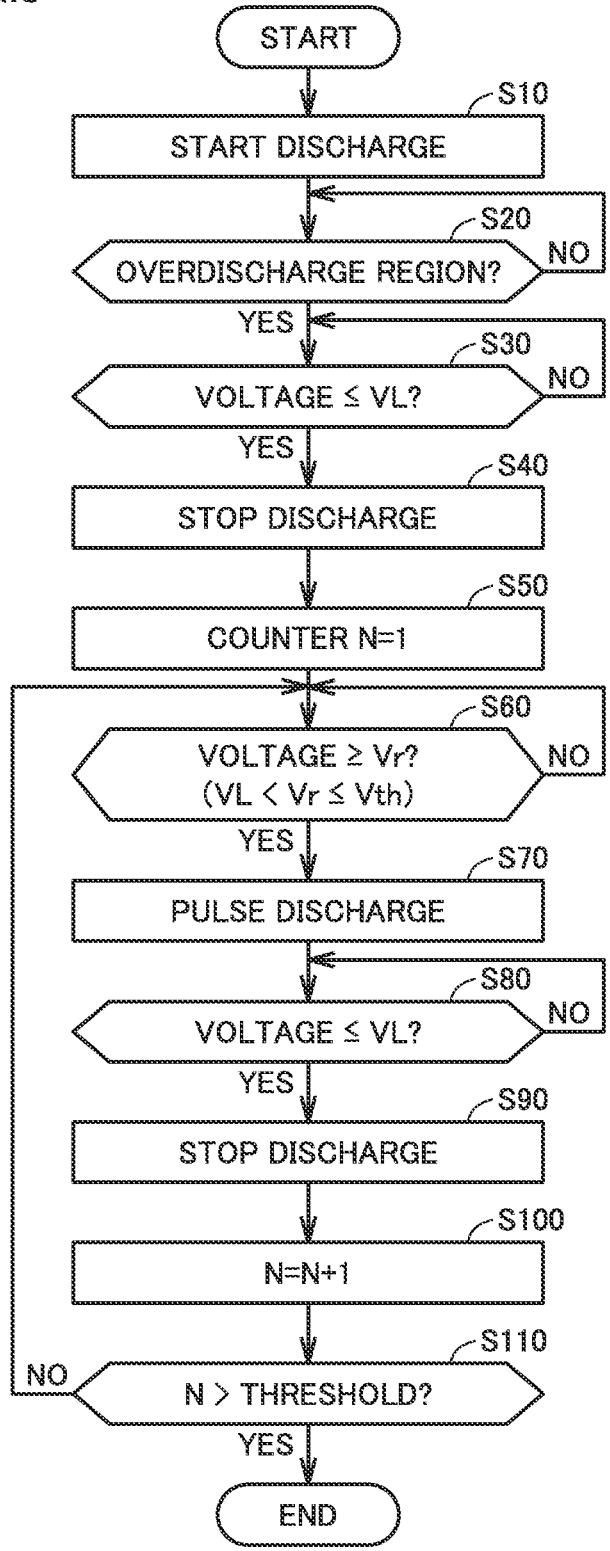

FIG.9

TEST CONDITIONS

| FREQUENCY | 4kHz |
| --- | --- |
| CURRENT | -20A |
| DUTY RATIO | 50% |
| MINIMUM VOLTAGE | VL, V1 |
| OVERDISCHARGE REGION MAINTAINING TIME | FOUR MINUTES |

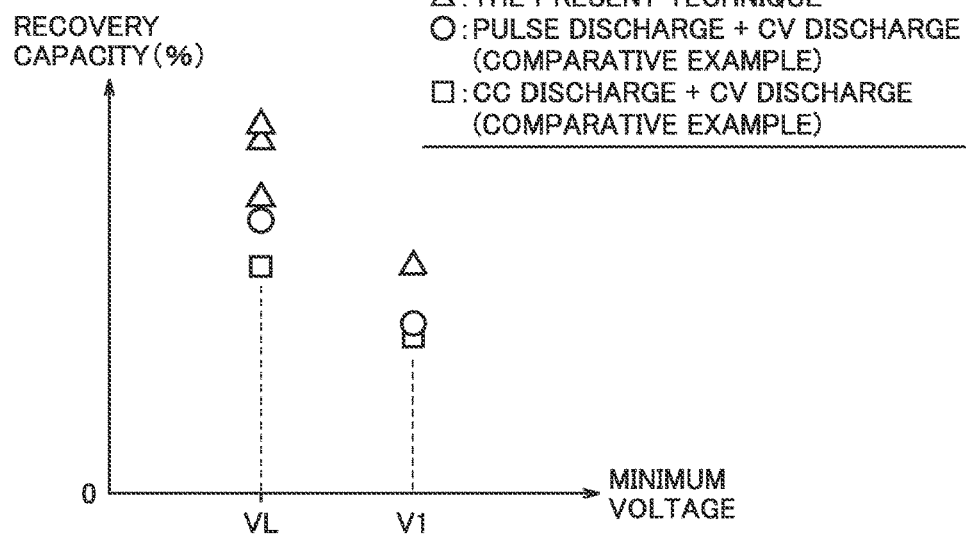

FIG.10
RECOVERY CAPACITY(%)

△: THE PRESENT TECHNIQUE
○: PULSE DISCHARGE + CV DISCHARGE (COMPARATIVE EXAMPLE)
□: CC DISCHARGE + CV DISCHARGE (COMPARATIVE EXAMPLE)

MINIMUM VOLTAGE

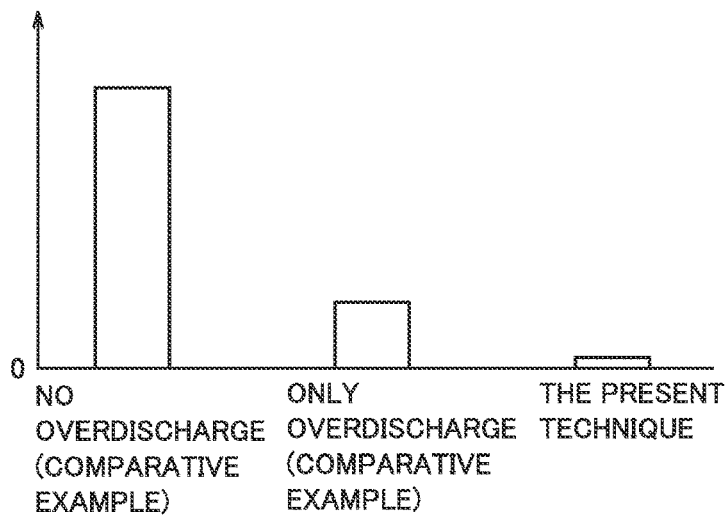

FIG.11
POTENTIAL DIFFERENCE IN NEGATIVE ELECTRODE (END PORTION/ CENTRAL PORTION)

NO OVERDISCHARGE (COMPARATIVE EXAMPLE) | ONLY OVERDISCHARGE (COMPARATIVE EXAMPLE) | THE PRESENT TECHNIQUE

TEST CONDITIONS

| FREQUENCY | 50Hz, 4kHz, 20kHz |
|---|---|
| CURRENT | −20A |
| DUTY RATIO | 50% |
| MINIMUM VOLTAGE | VL |
| OVERDISCHARGE REGION MAINTAINING TIME | TEN MINUTES |

TEST CONDITIONS

| FREQUENCY | 4kHz |
|---|---|
| CURRENT | −20A, −100A, −150A |
| DUTY RATIO | 50% |
| MINIMUM VOLTAGE | VL |
| OVERDISCHARGE REGION MAINTAINING TIME | TEN MINUTES |

TEST CONDITIONS

| FREQUENCY | 20kHz |
| --- | --- |
| CURRENT | −20A |
| DUTY RATIO | 50% |
| MINIMUM VOLTAGE | VL |
| OVERDISCHARGE REGION MAINTAINING TIME | TEN MINUTES |
| TEMPERATURE | 20°C、60°C、65°C |

BATTERY SYSTEM AND CAPACITY RECOVERY METHOD FOR LITHIUM ION SECONDARY BATTERY

This nonprovisional application is based on Japanese Patent Application No. 2017-239400 filed on Dec. 14, 2017 with the Japan Patent Office, the entire contents of which are hereby incorporated by reference.

BACKGROUND

Field

The present disclosure relates to a battery system and a capacity recovery method for a lithium ion secondary battery, and particularly, to technology for recovering a reduced capacity of a lithium ion secondary battery.

Description of the Background Art

Lithium ion secondary batteries having high energy density per weight attract attention as secondary batteries mounted in electric-powered vehicles such as electric vehicles and hybrid vehicles. The lithium ion secondary battery includes a positive electrode and a negative electrode disposed facing each other, and a separator disposed between the positive electrode and the negative electrode. A positive-electrode active material layer is provided in the positive electrode, and a negative-electrode active material layer is provided in the negative electrode. In general, the negative-electrode active material layer is wider than the positive-electrode active material layer, and the negative-electrode active material layer has, on its end, a non-facing portion that does not face the positive-electrode active material layer.

Lithium ions accumulated in the non-facing portion of the negative-electrode active material layer are released less easily from the negative-electrode active material layer in a discharge reaction in which lithium ions migrate from the negative-electrode active material layer to the positive-electrode active material layer. Consequently, when lithium ions are accumulated in the non-facing portion of the negative-electrode active material layer, the capacity of the lithium ion secondary battery decreases.

Japanese Patent Application No. 2015-187938 discloses a method of recovering a capacity of a lithium ion secondary battery having a reduced capacity as described above. This capacity recovery method discharges the lithium ion secondary battery to a reference state of charge (SOC) of not greater than an SOC of 10%, and subsequently continues the discharge by a constant-voltage discharge. This can return lithium ions accumulated in the non-facing portion of the negative-electrode active material layer to the positive-electrode active material layer, thus recovering the capacity of the lithium ion secondary battery.

Although the capacity recovery method for a lithium ion secondary battery described in Japanese Patent Application No. 2015-187938 is useful in that the lithium ions accumulated in the non-facing portion of the negative-electrode active material layer can be returned to the positive-electrode active material layer, it may take time to release the lithium ions accumulated in the non-facing portion from the negative-electrode active material layer, which is susceptible to improvement in terms of reducing a time for executing capacity recovery control.

SUMMARY

The present disclosure has been made to solve the above problem, and has an object to provide a battery system and a capacity recovery method capable of effectively recovering a capacity of a lithium ion secondary battery in a short period of time.

A battery system according to the present disclosure includes a lithium ion secondary battery including a positive-electrode active material layer and a negative-electrode active material layer disposed with a separator therebetween, a charging and discharging device configured to charge and discharge the lithium ion secondary battery, and a controller. The controller is configured to control the charging and discharging device to perform capacity recovery control of recovering a capacity of the lithium ion secondary battery. The negative-electrode active material layer includes a facing portion that faces the positive-electrode active material layer, and a non-facing portion that does not face the positive-electrode active material layer. The capacity recovery control includes first control and second control. The first control is control of discharging the lithium ion secondary battery to a predetermined overdischarge region. The second control is control of repeatedly performing, in the overdischarge region, a voltage increase of increasing a voltage across the lithium ion secondary battery due to a stop of the discharging and a pulse discharge of discharging the lithium ion secondary battery while oscillating a discharge current.

A capacity recovery method of the present disclosure is a capacity recovery method for a lithium ion secondary battery. The lithium ion secondary battery includes a positive-electrode active material layer and a negative-electrode active material layer disposed with a separator therebetween. The negative-electrode active material layer includes a facing portion that faces the positive-electrode active material layer, and a non-facing portion that does not face the positive-electrode active material layer. The capacity recovery method includes discharging the lithium ion secondary battery to a predetermined overdischarge region, and repeatedly performing, in the overdischarge region, a voltage increase of increasing a voltage across the lithium ion secondary battery due to a stop of the discharging and a pulse discharge of discharging the lithium ion secondary battery while oscillating a discharge current.

The overdischarge region is a region in which the lithium ion secondary battery is discharged excessively. For example, for the SOC of the lithium ion secondary battery, assuming that a capacity at a maximum voltage and a capacity at a minimum voltage in the normal use range of the lithium ion secondary battery are an SOC of 100% and an SOC of 0%, respectively, a predetermined overdischarge region is a region having an SOC of not greater than a predetermined value indicating that the lithium ion secondary battery is discharged excessively.

The above configuration can effectively oscillate, in the overdischarge region, the lithium ions accumulated in the non-facing portion of the negative-electrode active material layer which does not face the positive-electrode active material layer. This can effectively desorb the lithium ions accumulated in the non-facing portion from the negative-electrode active material layer in the overdischarge region, thus facilitating the migration of the lithium ions present in the non-facing portion to the positive-electrode active material layer. The battery system and the capacity recovery method can thus effectively recover the capacity of the lithium ion secondary battery in a short period of time.

The second control is preferably performed in a range in which the voltage across the lithium ion secondary battery does not fall below a predetermined lower-limit voltage.

This can reduce a risk that a collector may elute when the voltage across the lithium ion secondary battery is reduced.

The oscillation frequency of the discharge current in the pulse discharge is preferably 3 kHz to 20 kHz.

Setting the oscillation frequency of the discharge current in the pulse discharge to 3 kHz or higher can facilitate the migration of the lithium ions present in the non-facing portion of the negative-electrode active material layer which does not face the positive-electrode active material layer to the positive-electrode active material layer. Although setting an oscillation frequency excessively high may cause damage to the battery, for example, the generation of heat may be increased due to a dielectric loss, reducing the oscillation frequency to 20 kHz or less can suppress damage to the battery.

The capacity recovery control is preferably performed under the condition that the temperature of the lithium ion secondary battery is 40° C. to 80° C.

Setting the temperature of the lithium ion secondary battery to 40° C. or higher can facilitate the migration of lithium ions present in the non-facing portion of the negative-electrode active material layer which does not face the positive-electrode active material layer to the positive-electrode active material layer. Although an excessively high temperature may increase an internal pressure due to the generation of gas inside the battery, an increase in the internal pressure of a battery can be suppressed by keeping the temperature at 80° C. or lower.

The overdischarge region is preferably a region in which the SOC of the lithium ion secondary battery is 0% or less.

The execution of capacity recovery control in the overdischarge region in which the SOC is 0% or less can effectively recover the capacity of the lithium ion secondary battery in a short period of time.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 conceptually shows how a lithium ion migrates between a positive electrode and a negative electrode along with charge and discharge.

FIG. 4 conceptually shows how lithium ions are accumulated in the negative electrode through charge of the lithium ion secondary battery.

FIG. 8 is a flowchart illustrating a process flow of capacity recovery control performed by an ECU.

FIG. 9 shows example test conditions of the capacity recovery control.

FIG. 10 shows capacity recovery effects when the capacity recovery control is performed on the conditions shown in FIG. 9.

FIG. 11 shows a potential difference between an end portion and a central portion of a negative electrode.

DESCRIPTION OF THE PREFERRED EMBODIMENTS

Figure 1:
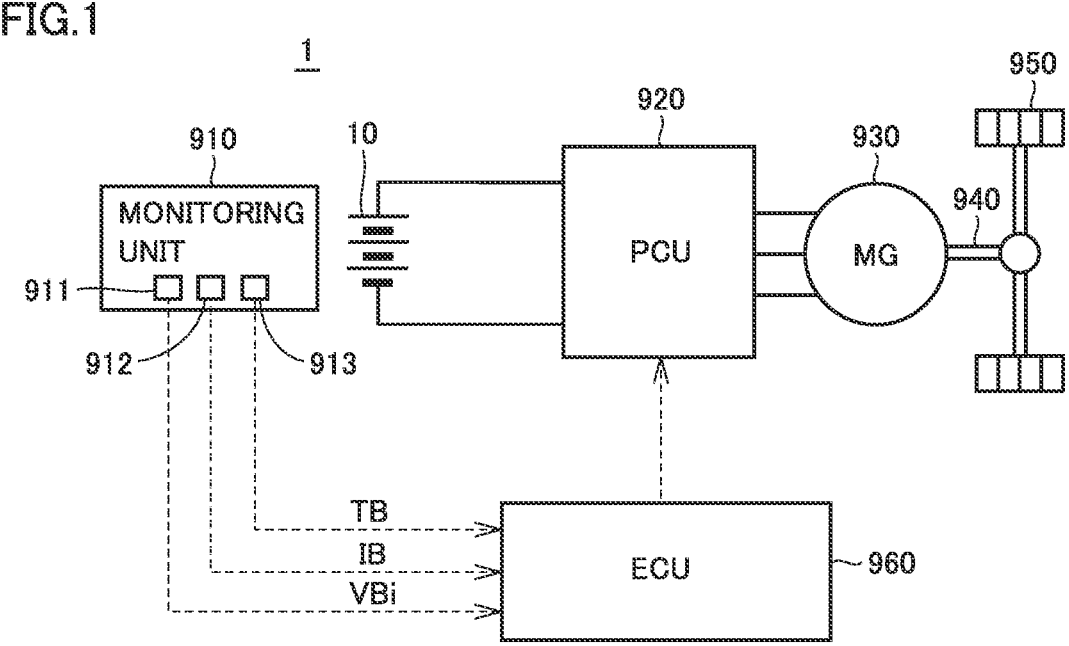
FIG. 1 schematically shows a configuration of an electric-powered vehicle in which a battery system according to an embodiment of the present disclosure is mounted.

The following describes embodiments of the present disclosure with reference to figures in detail. It should be noted that the same or corresponding portions are given the same reference characters and are not described repeatedly.

FIG. 1 schematically shows a configuration of an electric-powered vehicle 1 in which a battery system according to an embodiment of the present disclosure is mounted. Although the following will representatively describe a case in which electric-powered vehicle 1 is an electric vehicle (EV), the battery system according to the present disclosure is not limited to a system mounted in an EV and may be mounted in a hybrid vehicle (HV), a plug-in HV, or any other vehicle, and is further applicable for purposes other than the vehicles.

With reference to FIG. 1, electric-powered vehicle 1 includes an assembled battery 10, a monitoring unit 910, a power control unit (hereinafter referred to as "PCU") 920, a motor generator (hereinafter referred to as "MG") 930, a drive shaft 940, drive wheels 950, and an electronic control unit (hereinafter referred to as "ECU") 960.

Assembled battery 10 includes a large number of lithium ion secondary batteries (hereinafter also merely referred to as "cells"). Specifically, a module is formed of a collection of a plurality of cells, and the plurality of modules are electrically connected to constitute assembled battery 10. Assembled battery 10 stores the electric power for driving MG 930 and can supply electric power to MG 930 through PCU 920. Also, assembled battery 10 receives generated electric power through PCU 920 to be charged when MG 930 generates electric power.

Monitoring unit 910 includes a voltage sensor 911, a current sensor 912, and a temperature sensor 913. Voltage sensor 911 detects a voltage VBi for each of cells (which may include a plurality of parallel-connected cells). Current sensor 912 detects a charge and discharge current IB of assembled battery 10, and temperature sensor 913 detects a temperature TB of assembled battery 10. In the present embodiment, current sensor 912 detects a charge current as a positive value and detects a discharge current as a negative value.

PCU 920 performs bidirectional power conversion between assembled battery 10 and MG 930 in accordance with a control signal from ECU 960. PCU 920 includes, for example, an inverter that drives MG 930 and a converter that boosts a DC voltage supplied to the inverter to an output voltage of assembled battery 10 or higher.

PCU 920 also acts as a charging and discharging device that charges and discharges assembled battery 10 without driving MG 930 in accordance with a control signal from ECU 960 in the execution of capacity recovery control (described below) of recovering a reduced capacity of assembled battery 10.

For example, when assembled battery 10 is discharged in the capacity recovery control, PCU 920 acts such that current flows from assembled battery 10 to a power buffer device (not shown) connected to PCU 920. When assembled battery 10 is charged in the capacity recovery control, PCU 920 acts such that current flows from the power buffer device to assembled battery 10.

Alternatively, when electric-powered vehicle 1 is an HV in which an engine is mounted, PCU 920 may be caused to act such that when assembled battery 10 is charged in the capacity recovery control, the electric power generated through the activation of the engine is supplied to assembled battery 10. When assembled battery 10 is discharged in the capacity recovery control, PCU 920 may be caused to act such that a d-axis current, which does not generate rotational torque, alone flows to MG 930.

MG 930 is representatively an AC (Alternate Current) rotating electric machine, for example, a three-phase AC synchronous motor with a permanent magnet buried in its rotor. MG 930 is driven by PCU 920 to generate rotational driving force, and the driving force generated by MG 930 is conveyed through drive shaft 940 to drive wheels 950. When electric-powered vehicle 1 is braked or when acceleration is reduced on an inclined slope, MG 930 operates as a generator and performs regenerative power generation. The electric power generated by MG 930 is supplied through PCU 920 to assembled battery 10.

ECU 960 includes a central processing unit (CPU), memories (a read only memory (ROM) and a random access memory (RAM)), and an input/output port for input/output of various signals (all of which are not shown). ECU 960 controls PCU 920 based on a signal received from each sensor, and a program and map stored in the memories to control driving of MG 930 and charge and discharge of assembled battery 10. ECU 960 also calculates the SOC of assembled battery 10 based on the charge and discharge current of assembled battery 10 and/or a detection value of voltage. For example, the SOC is calculated such that the capacity at a maximum voltage and the capacity at a minimum voltage in a normal use range of assembled battery 10 are set to an SOC of 100% and an SOC of 0%, respectively.

<Configuration of Lithium Ion Secondary Battery>

Figure 2:
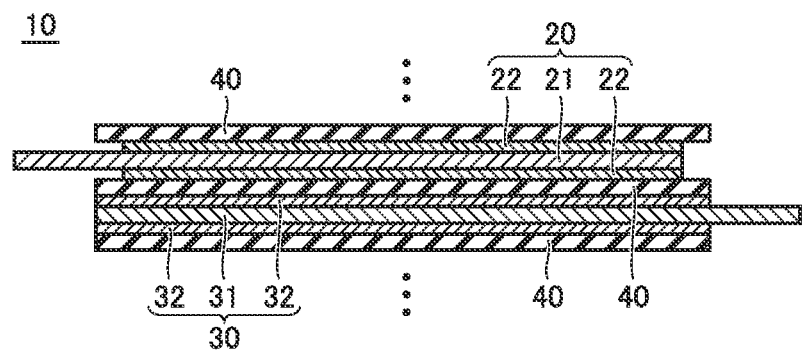
FIG. 2 is a sectional view schematically showing the structure of a lithium ion secondary battery of an assembled battery.

FIG. 2 is a sectional view schematically showing the structure of a lithium ion secondary battery of assembled battery 10. With reference to FIG. 2, the lithium ion secondary battery is formed of positive electrodes 20 and negative electrodes 30 alternately stacked via separators 40, and the stack is covered with an electrolyte (not shown).

Positive electrode 20 includes a rectangular collector 21 and positive-electrode active material layers 22 formed on the opposite surfaces of collector 21. Collector 21 is formed of, for example, aluminum foil. Positive-electrode active material layer 22 is formed of, for example, lithium metallic oxide such as lithium cobaltite. Negative electrode 30 includes a rectangular collector 31 and negative-electrode active material layers 32 formed on the opposite surfaces of collector 31. Collector 31 is formed of, for example, copper foil. Negative-electrode active material layer 32 is formed of, for example, carbon material such as graphite.

Separator 40 is formed of, for example, microporous membrane such as polyolefin. The electrolyte (not shown) is formed of, for example, liquid electrolyte obtained by dissolving lithium salt in a carbonate organic solvent.

Positive-electrode active material layer 22 and negative-electrode active material layer 32 are disposed with separator 40 therebetween. As shown in FIG. 2, negative electrode 30 is larger than positive electrode 20. Specifically, negative-electrode active material layer 32 is wider than positive-electrode active material layer 22. Thus, negative-electrode active material layer 32 has a portion that faces positive-electrode active material layer 22 and a portion (an end of negative-electrode active material layer 32) that does not face positive-electrode active material layer 22. Negative-electrode active material layer 32 is formed to be wider than positive-electrode active material layer 22 for the purpose of, for example, suppressing deposition of lithium on a side surface of negative electrode 30.

<Explanation of Battery Recovery Mechanism>

FIG. 3 conceptually shows how a lithium ion migrates along with charge and discharge between positive electrode 20 and negative electrode 30. With reference to FIG. 3, when the lithium ion secondary battery is charged, an electron is supplied to negative electrode 30, so that a lithium ion migrates from positive electrode 20 (positive-electrode active material layer 22) to negative electrode 30 (negative-electrode active material layer 32). In contrast, when the lithium ion secondary battery is discharged, an electron is supplied to positive electrode 20, so that a lithium ion migrates from negative electrode 30 (negative-electrode active material layer 32) to positive electrode 20 (positive-electrode active material layer 22).

Figure 5:
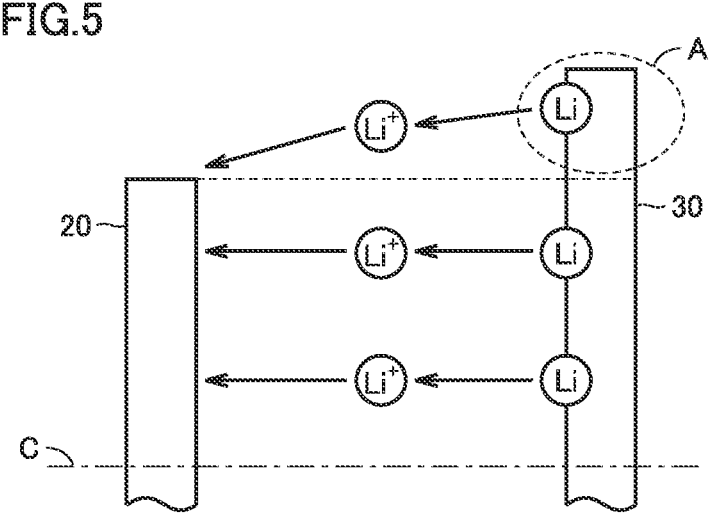
FIG. 5 conceptually shows how lithium ions migrate from the negative electrode to the positive electrode when the lithium ion secondary battery is discharged.

FIG. 4 conceptually shows how lithium ions are accumulated in negative electrode 30 through charge of the lithium ion secondary battery. FIG. 4 and FIG. 5, which will be described later, show the upper half of FIG. 3 in an enlarged manner. In FIGS. 4 and 5, an alternate long and short dash line C indicates the vertical center of positive electrode 20 and negative electrode 30 shown in FIG. 3. A similar phenomenon occurs also in the lower half of FIG. 3, symmetrically to the upper half of FIG. 3.

With reference to FIG. 4, during charge of the lithium ion secondary battery, lithium ions are coupled to electrons supplied to negative electrode 30 to be accumulated in negative electrode 30 (negative-electrode active material layer 32). A region A is a portion of negative electrode 30, in which negative electrode 30 (negative-electrode active material layer 32) does not face positive electrode 20 (positive-electrode active material layer 22). This region A may be referred to as, for example, a "non-facing portion" of negative electrode 30 which does not face positive electrode 20 or an "end portion" of negative electrode 30. In contrast, the portion of negative electrode 30 which faces positive electrode 20 may be referred to as, for example, a "facing portion" of negative electrode 30 which faces positive electrode 20 or a "center portion" of negative electrode 30.

Lithium ions are accumulated in negative electrode 30 during charge of the lithium ion secondary battery, where lithium ions are accumulated not only in the facing portion of negative electrode 30 which faces positive electrode 20 but also in the non-facing portion of negative electrode 30 which does not face positive electrode 20.

FIG. 5 conceptually shows how lithium ions migrate from negative electrode 30 to positive electrode 20 during discharge of the lithium ion secondary battery. With reference to FIG. 5, during discharge of the lithium ion secondary battery, the lithium ions accumulated in negative electrode 30 are desorbed from negative electrode 30 and migrate to positive electrode 20.

In this case, in the facing portion and the non-facing portion of negative electrode 30, the lithium ions accumulated in the facing portion start migrating to positive electrode 20 earlier, and the lithium ions accumulated in the non-facing portion migrate less easily than the lithium ions accumulated in the facing portion. The lithium ions remaining in the non-facing portion even after a discharge operation do not contribute to charge and discharge of the lithium ion secondary battery, and accordingly reduce the capacity of the lithium ion secondary battery.

Thus, the lithium ion secondary battery is discharged until it is overdischarged as performed by the technique described in Japanese Patent Application No. 2015-187938, thus allowing the lithium ions accumulated in the non-facing portion of negative electrode 30 to migrate to positive electrode 20 as well.

However, the technique described in Japanese Patent Application No. 2015-187938 may require time to release the lithium ions accumulated in the non-facing portion of negative electrode 30 from negative electrode 30, which is susceptible to improvement in terms of reducing a time for executing control of recovering the capacity of the lithium ion secondary battery. Although it is also conceivable in this case that the lithium ions in the non-facing portion are released by advancing the overdischarge of the battery (further reducing voltage), excessively advancing overdischarge (reducing voltage) may lead to a higher risk of elusion of a collector.

The battery system according to the present embodiment thus performs control for discharging a lithium ion secondary battery to a predetermined overdischarge region and then effectively oscillating lithium ions accumulated in the non-facing portion of negative electrode 30 in the overdischarge region. Specifically, in the overdischarge region, a voltage increase of increasing the voltage across the lithium ion secondary battery due to a stop of discharge and a pulse discharge of discharging the lithium ion secondary battery while oscillating a discharge current are performed repeatedly.

Consequently, in the overdischarge region, the lithium ions accumulated in the non-facing portion of negative electrode 30 can be effectively desorbed from negative-electrode active material layer 32, facilitating the migration of the lithium ions present in the non-facing portion to positive electrode 20. This battery system can accordingly effectively recover the capacity of assembled battery 10 in a short period of time. The capacity recovery control performed in this battery system will be described below in detail.

<Explanation of Capacity Recovery Control>

Figure 6:
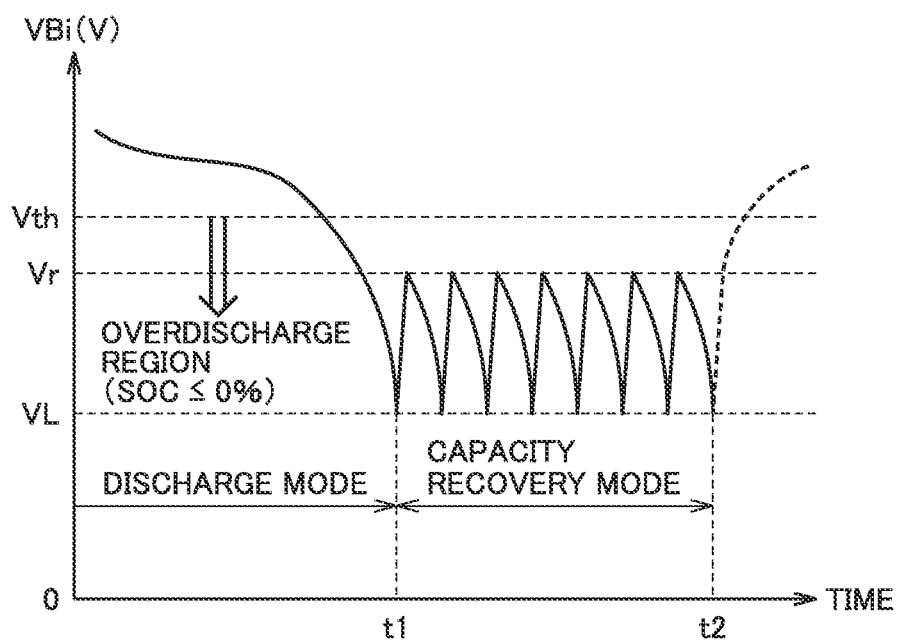
FIG. 6 is a diagram for illustrating a capacity recovery method in a battery system according to the present embodiment.

FIG. 6 is a diagram for illustrating a capacity recovery method in the battery system according to the present embodiment. FIG. 6 shows a time shift of voltage VBi across a cell during the execution of the capacity recovery method.

With reference to FIG. 6, the capacity recovery method includes control modes including a "discharge mode" and a "capacity recovery mode". In the discharge mode, PCU 920 (FIG. 1) discharges assembled battery 10 to the overdischarge region. The overdischarge region is, for example, a region in which the SOC is 0% or less, and in the overdischarge region, voltage VBi across the cell is equal to or lower than a predetermined voltage Vth.

At a time t1, when voltage VBi reaches a lower-limit voltage VL allowable as the lower limit that can be taken by voltage VBi, the control mode shifts from the discharge mode to the capacity recovery mode. In the capacity recovery mode, (i) a voltage increase due to a stop of discharge, and (ii) a pulse discharge of performing discharge while oscillating current by PCU 920 (FIG. 1) are performed repeatedly.

Since excessively reduced voltage VBi increases a risk of the elution of a collector, lower-limit voltage VL is set to a voltage level that does not lead to the elution of the collector. As to the voltage increase due to a stop of discharge, voltage recovers (increases) when discharge is stopped in the overdischarge region, so voltage VBi is recovered (increased) until voltage VBi reaches a predetermined voltage Vr set to voltage Vth or lower.

Figure 7:
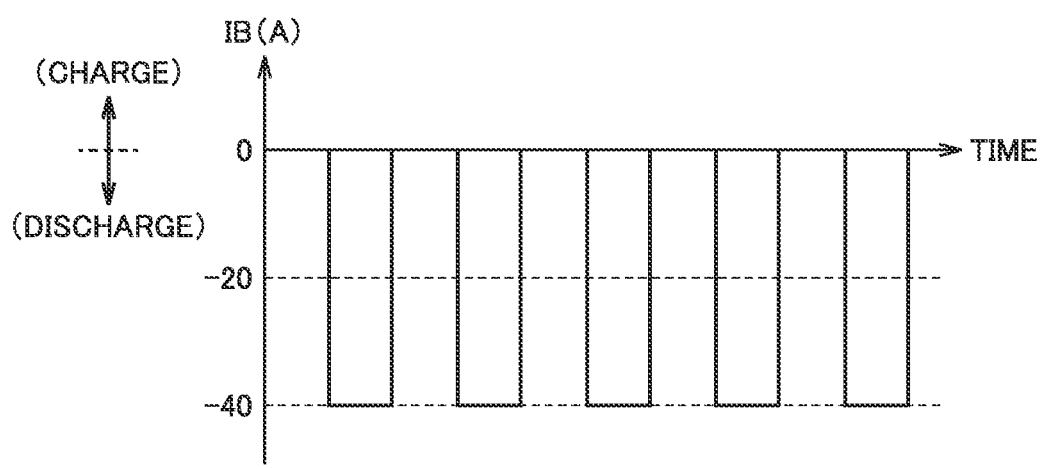
FIG. 7 shows an example current waveform of a pulse discharge performed in a capacity recovery mode.

FIG. 7 shows an example current waveform of a pulse discharge performed in the capacity recovery mode. With reference to FIG. 7, in this example, a pulse discharge current is a pulse current having a peak value of −40 A (discharge), a predetermined frequency (e.g., 3 kHz to 20 kHz), and a duty ratio of 50%. Since the duty ratio is 50%, the average current is −20 A. ECU 960 controls PCU 920 to allow such a pulse discharge current to flow through assembled battery 10.

The discharge current caused to flow in the pulse discharge is not limited to a current having such a current waveform. Although not particularly shown, for example, the pulse discharge current may be a discharge current of a sinusoidal shape which oscillates at a predetermined frequency without inverting the current direction to a charge direction.

Again with reference to FIG. 6, in the capacity recovery mode, a voltage increase due to a stop of discharge and a pulse discharge shown in FIG. 7 (FIG. 6 does not show short, quick voltage oscillations due to pulse discharge) are repeatedly performed between lower-limit voltage VL and voltage Vr set to voltage Vth or lower. This allows the lithium ions accumulated in the non-facing portion of negative electrode 30 to be oscillated effectively to be desorbed from negative electrode 30, facilitating the migration of the lithium ions present in the non-facing portion to positive electrode 20.

Although the effect of releasing the lithium ions accumulated in the non-facing portion of negative electrode 30 to recover capacity is not substantial, a pulse discharge similar to a discharge in the capacity recovery mode may be performed also in discharge in the discharge mode.

FIG. 8 is a flowchart illustrating a process flow of capacity recovery control performed by ECU 960. With reference to FIG. 8, when a start of capacity recovery control is instructed, ECU 960 sets the control mode to the discharge mode and controls PCU 920 to start discharging assembled battery 10 (step S10).

When the discharge is started, ECU 960 determines whether assembled battery 10 has entered the overdischarge region (step S20). Specifically, ECU 960 calculates an SOC to determine whether the SOC is 0% or less. Whether assembled battery 10 has entered the overdischarge region may be determined by determining whether voltage VBi is voltage Vth (see FIG. 6) or lower.

When determining that assembled battery 10 has entered the overdischarge region (YES in step S20) and voltage VBi has reached lower-limit voltage VL (YES in step S30), ECU 960 sets the control mode to the capacity recovery mode and sets "1" in a counter N (step S40). This counter N is used to count the number of times where the voltage increase due to a stop of discharge and the pulse discharge have been performed in the capacity recovery mode.

Subsequently, ECU 960 stops PCU 920 to stop the discharge of assembled battery 10 (step S50). This increases voltage VBi. When determining that voltage VBi has reached voltage Vr set to voltage Vth or lower (YES in step S60), ECU 960 controls PCU 920 to perform the pulse discharge (see FIG. 7) of discharging assembled battery 10 while oscillating the current (step S70).

When the pulse discharge has been performed, voltage VBi drops again. Subsequently, when determining that voltage VBi has reached lower-limit voltage VL again (YES in step S80), ECU 960 stops PCU 920 to stop the discharge of assembled battery 10 (step S90). When the discharge is stopped, voltage VBi increases.

Subsequently, ECU 960 adds one to counter N (step S100) and determines whether counter N has exceeded a threshold (step S110). This threshold is a value that defines the number of times where the voltage increase due to a stop of discharge and the pulse discharge are performed repeatedly in the capacity recovery mode.

When determining that counter N is not greater than the threshold (NO in step S110), the process is returned to step S60, and the processes of step S60 and the following steps are performed again. When the processes from steps S60 to step S90 (the voltage increase due to a stop of discharge and the pulse discharge) are repeatedly performed by the number of times indicated by the threshold and ECU 960 determines that counter N has exceeded the threshold (YES in step S110), ECU 960 advances the process to END.

FIGS. 9 to 11 are diagrams for illustrating effects of the capacity recovery method according to the present embodiment. FIG. 9 shows example test conditions of capacity recovery control, and FIG. 10 shows the capacity recovery effects when the capacity recovery control was performed on the conditions shown in FIG. 9.

With reference to FIG. 9, in this example, the frequency of pulse discharge was 4 kHz, and the magnitude (average current) and the duty ratio of pulse current were −20 A and 50%, respectively. A minimum voltage of voltage VBi in the overdischarge region was tested for two cases, namely, a lower-limit voltage VL and a voltage V1 (VL<V1<Vth) higher than lower-limit voltage VL, and the time for maintaining the overdischarge region was four minutes.

With reference to FIG. 10, the horizontal axis represents a minimum voltage of voltage VBi in the overdischarge region, and the vertical axis represents a recovery capacity (%) of assembled battery 10 (or cell). "Δ" shows the test results of the capacity recovery method according to the present embodiment (the present technique). This example shows the results obtained by performing the pulse discharge also in discharge in the discharge mode.

"○" and "□" show the test results of the comparative examples. Specifically, "○" shows the test results when the pulse discharge was performed to the minimum voltage in the overdischarge region, and a constant voltage discharge (CV discharge) was performed at the minimum voltage in the overdischarge region. That is to say, the test results indicated by "○" are the results when the voltage increase due to a stop of discharge and the pulse discharge were not performed repeatedly in the capacity recovery mode of the present technique. "□" shows test results when a constant current charge (CC charge) was performed further to the minimum voltage in the overdischarge region.

As shown in FIG. 10, the capacity recovery effects by the present technique are more substantial than the capacity recovery effects in the comparative example. It is understood that the capacity recovery effects by the present technique are more substantial as the minimum voltage of voltage VBi is lower. In the capacity recovery method according to the present embodiment, thus, substantial capacity recovery effects can be achieved by performing discharge until voltage VBi reaches lower-limit voltage VL in the discharge mode, and subsequently, repeatedly performing the voltage increase due to a stop of discharge and the pulse discharge in the capacity recovery mode.

FIG. 11 shows a potential difference between the end portion and the central portion of the negative electrode. The potential of the negative electrode can be measured for each portion (such as the central portion or the end portion) of the electrode, and accordingly, a potential difference between the end portion and the central portion of the negative electrode can be measured. Since the portion having a higher accumulation amount of lithium ions has a higher potential in the negative electrode, an accumulation amount (remaining amount) of lithium ions in the end portion of the negative electrode can be estimated from the potential difference between the end portion and the central portion of the negative electrode after the execution of the capacity recovery control. That is to say, it is revealed that as a potential difference between the end portion and the central portion of the negative electrode after discharge is smaller, the accumulation amount (remaining amount) of lithium ions in the end portion of the negative electrode is smaller, and the capacity recovery effects are more substantial.

With reference to FIG. 11, "the present technique" indicates a potential difference in the negative electrode (a potential difference between the end portion and the central portion of negative electrode 30) after the execution of the capacity recovery control according to the present embodiment. "No overdischarge" and "only overdischarge" show potential differences in the negative electrode in the comparative examples. Specifically, "no overdischarge" indicates a potential difference in the negative electrode after discharge when discharge is not performed to the overdischarge region. "Only overdischarge" indicates a potential difference in the negative electrode when a constant voltage discharge was performed after discharge to the overdischarge region.

As shown in FIG. 11, the potential difference in the negative electrode after the execution of the capacity recovery control of the present technique is much smaller than the potential difference in the negative electrode after the execution of discharge in the comparative example. This reveals that the capacity recovery control according to the present embodiment can reduce an accumulation amount (remaining amount) of lithium ions in the end portion of negative electrode 30 to be extremely small, achieving substantial capacity recovery effects.

Figures 12, 13:
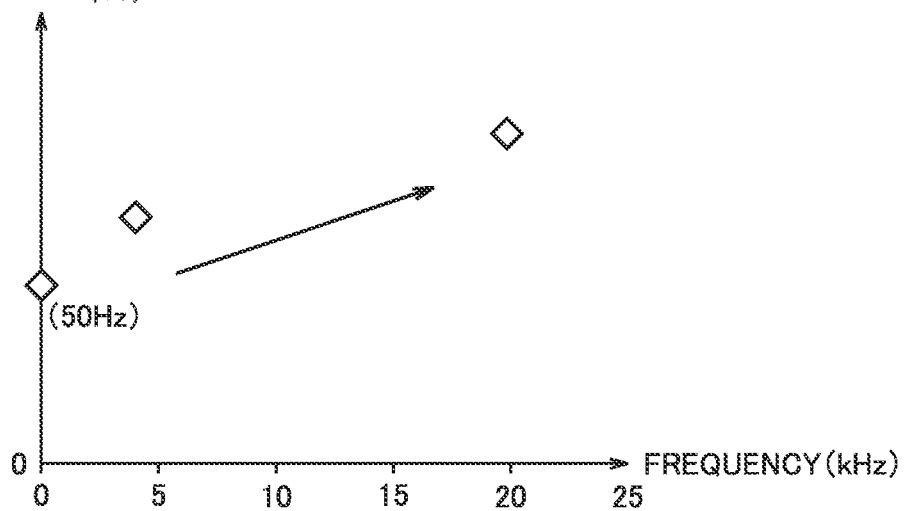
FIG. 12 shows example test conditions of the capacity recovery control.
FIG. 13 shows capacity recovery effects when the capacity recovery control was performed on the conditions shown in FIG. 12.

FIGS. 12 and 13 show the relationship between the frequency of pulse discharge and recovery capacity in capacity recovery control according to the present embodiment. FIG. 12 shows example test conditions of capacity recovery control, and FIG. 13 shows capacity recovery effects when capacity recovery control was performed on the conditions shown in FIG. 12.

With reference to FIG. 12, in this example, tests were performed for three cases where the frequency of pulse discharge was 50 Hz, 4 kHz, and 20 kHz. The magnitude (average current) and the duty ratio of pulse current were −20 A and 50%, respectively. The minimum voltage of voltage VBi in the overdischarge region was lower-limit voltage VL, and the time for maintaining the overdischarge region was ten minutes.

With reference to FIG. 13, the horizontal axis represents the frequency of pulse discharge, and the vertical axis represents the recovery capacity (%) of assembled battery 10 (or cell). As shown in FIG. 13, the capacity recovery effects are more substantial as the frequency of pulse discharge is higher. Since sufficiently substantial capacity recovery effects were achieved at a frequency of 4 kHz, it is considered that substantial capacity recovery effects can be achieved even when the frequency of pulse discharge is approximately 3 kHz, so the frequency is preferably 3 kHz or higher.

Setting the frequency of pulse discharge excessively high results in severe damage to the battery, for example, a larger amount of heat generation due to a dielectric loss. When the frequency of pulse discharge was set to be higher than 20 kHz, not much increase in the capacity recovery effect was found. Thus, the frequency of pulse discharge is preferably set to 20 kHz or lower.

Figures 14, 15:
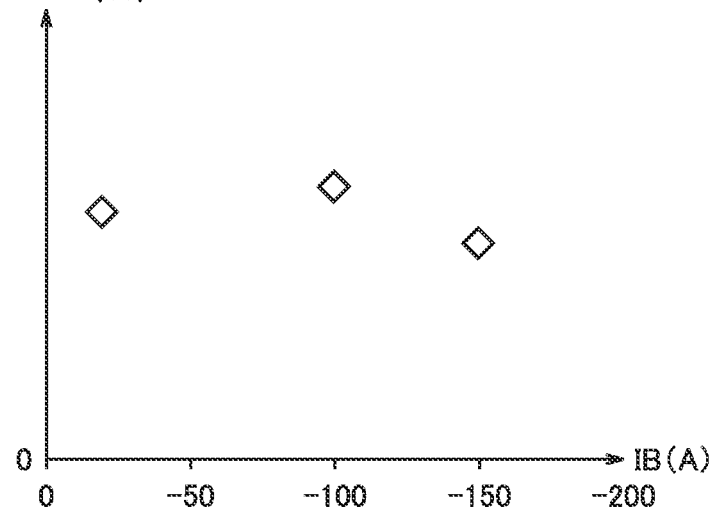
FIG. 14 shows example test conditions of the capacity recovery control.
FIG. 15 shows capacity recovery effects when the capacity recovery control was performed on the conditions shown in FIG. 14.

FIGS. 14 and 15 show the relationship between the magnitude of current and the recovery capacity in pulse discharge in capacity recovery control according to the present embodiment. FIG. 14 shows example test conditions of the capacity recovery control, and FIG. 15 shows capacity recovery effects when the capacity recovery control was performed on the conditions shown in FIG. 14.

With reference to FIG. 14, in this example, the frequency of pulse discharge was 4 kHz. Tests were performed for three cases where the magnitude (average current) of a pulse current was −20 A, −100 A, and −150 A, and the duty ratio thereof was 50%. A minimum voltage of voltage VBi in the overdischarge region was lower-limit voltage VL, and the time for maintaining the overdischarge region was ten minutes.

With reference to FIG. 15, the horizontal axis represents the magnitude (average current) of pulse current, and the vertical axis represents recovery capacity (%) of assembled battery 10 (or cell). As shown in FIG. 15, even when the pulse current was increased, no increase was found in capacity recovery effects, and no correlation was found between the magnitude of the pulse current and the recovery capacity.

Figures 16, 17:
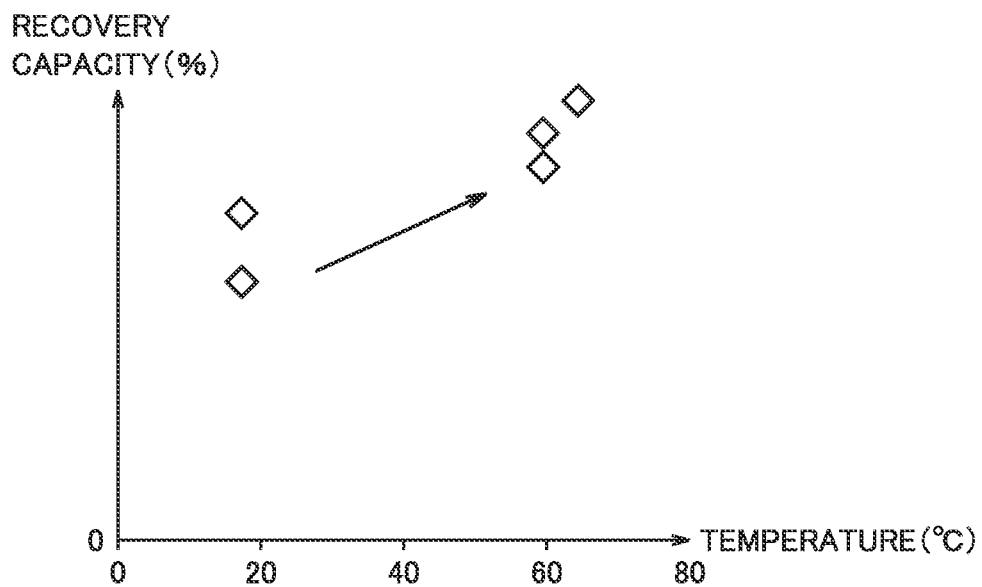
FIG. 16 shows example test conditions of the capacity recovery control.
FIG. 17 shows capacity recovery effects when the capacity recovery control was performed on the conditions shown in FIG. 16.

FIGS. 16 and 17 show the relationship between the temperature of assembled battery 10 and the recovery capacity in capacity recovery control according to the present embodiment. FIG. 16 shows example test conditions of capacity recovery control, and FIG. 17 shows capacity recovery effects when capacity recovery control was performed on the conditions shown in FIG. 16.

With reference to FIG. 16, the frequency of pulse discharge was 20 kHz, and the magnitude (average current) and the duty ratio of pulse current were −20 A and 50%, respectively. A minimum voltage of voltage VBi in the overdischarge region was lower-limit voltage VL, and the time for maintaining the overdischarge region was ten minutes. Tests were performed for three cases where the temperature of assembled battery 10 was 20° C., 60° C., and 65° C.

With reference to FIG. 17, the horizontal axis represents the temperature of assembled battery 10, and the vertical axis represents the recovery capacity (%) of assembled battery 10 (or cell). As shown in FIG. 17, the capacity recovery effects are more substantial as temperature is higher. It is considered from this result that substantial capacity recovery effects are obtained when the temperature of assembled battery 10 is approximately 40° C., and capacity recovery control is preferably performed under the condition that the temperature of assembled battery 10 is 40° C. or higher.

At higher temperatures of assembled battery 10, the temperature increases further by capacity recovery control, and an increase in internal pressure due to, for example, gas generation within the battery is feared. It is considered that when the temperature of assembled battery 10 is 80° C. or lower, an increase in the internal pressure of the battery can be suppressed, and capacity recovery control is preferably performed under the condition that the temperature of assembled battery 10 is 80° C. or lower.

As described above, in the present embodiment, the lithium ions accumulated in the non-facing portion of negative electrode 30 (negative-electrode active material layer 32) which does not face positive electrode 20 (positive-electrode active material layer 22) can be oscillated effectively in the overdischarge region. As a result, in the overdischarge region, the lithium ions accumulated in the non-facing portion can be effectively desorbed from negative-electrode active material layer 32, facilitating the migration of the lithium ions present in the non-facing portion to positive-electrode active material layer 22. Thus, the present embodiment can effectively recover the capacity of assembled battery 10 in a short period of time.

In the present embodiment, capacity recovery control is performed in a range in which voltage VBi across the cell does not fall below lower-limit voltage VL, thus reducing a risk that the collector may elute when voltage VBi is reduced.

Also, setting the oscillation frequency of a discharge current in the pulse discharge to 3 kHz or higher can facilitate the migration of the lithium ions present in the non-facing portion of negative electrode 30 to positive electrode 20. On the other hand, setting the oscillation frequency to 20 kHz or lower can suppress damage to the battery.

Performing capacity recovery control under the condition that the temperature of assembled battery 10 is 40° C. or higher can facilitate the migration of the lithium ions present in the non-facing portion of negative electrode 30 to positive electrode 20. On the other hand, performing capacity recovery control under the condition that the temperature is 80° C. or lower can suppress an increase in the internal pressure of the battery.

According to the present embodiment, performing capacity recovery control in the overdischarge region in which the SOC is 0% or less can effectively recover the capacity of assembled battery 10 in a short period of time.

[Modifications]

As described above, capacity recovery control is preferably performed under the condition that the temperature of assembled battery 10 is 40° C. to 80° C. Thus, when the temperature of assembled battery 10 is 40° C. or lower, the capacity recovery control described in the embodiment may be performed after the execution of temperature increase control of increasing the temperature of assembled battery 10.

Figure 18:
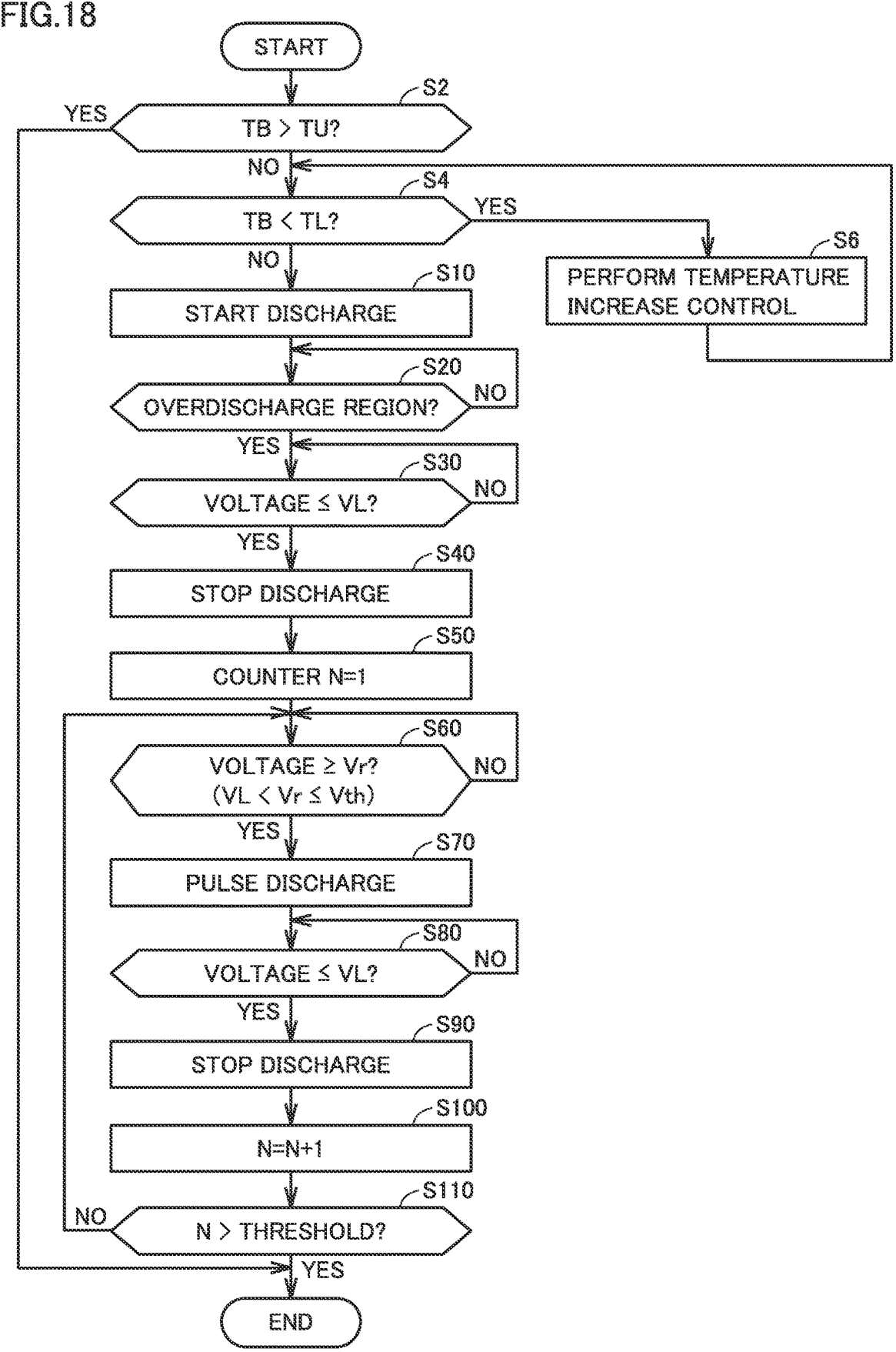
FIG. 18 is a flowchart illustrating a process flow of capacity recovery control in a modification.

FIG. 18 is a flowchart illustrating a process flow of capacity recovery control in the modification. With reference to FIG. 18, when start of capacity recovery control is instructed, ECU 960 obtains a temperature TB of assembled battery 10 from temperature sensor 913 and determines whether temperature TB is higher than TU (step S2). TU represents a temperature upper-limit value at which capacity recovery control is performed and is set to 80° C.

When temperature TB is higher than TU (YES in step S2), it is necessary to wait until temperature TB decreases to TU or lower, and the process proceeds to END without the execution of a series of processes below.

When determining in step S2 that temperature TB is TU or lower (NO in step S2), ECU 960 determines whether temperature TB is lower than TL (step S4). TL represents a temperature lower-limit value at which capacity recovery control is performed and is set to 40° C.

When determining that temperature TB is lower than TL (YES in step S4), ECU 960 performs temperature increase control of increasing the temperature of assembled battery 10 (step S6). For example, the temperature of assembled battery 10 can be increased by operating PCU 920 such that electric power is transferred between assembled battery 10 and a power buffer device (not shown) connected to PCU 920. When the temperature increase control is performed, the process is returned to step S4.

When determining that temperature TB is TL or higher in step S4 (NO in step S4), ECU 960 advances the process to step S10, sets the control mode to the discharge mode, and controls PCU 920 to start discharging assembled battery 10. The process of step S10 and the following processes have been described with reference to FIG. 8, which will not be repeated.

This modification performs temperature increase control and then performs capacity recovery control when the temperature of assembled battery 10 is low, and accordingly, capacity recovery effects by capacity recovery control can be achieved reliably. The capacity of assembled battery 10 can thus be recovered effectively in a short period of time.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A battery system comprising:
    a lithium ion secondary battery including a positive-electrode active material layer and a negative-electrode active material layer disposed with a separator therebetween;
    a charging and discharging device configured to charge and discharge the lithium ion secondary battery; and
    a controller configured to control the charging and discharging device to perform capacity recovery control of recovering a capacity of the lithium ion secondary battery,
    the negative-electrode active material layer including
        a facing portion that faces the positive-electrode active material layer, and
        a non-facing portion that does not face the positive-electrode active material layer,
    the capacity recovery control including
        first control of discharging the lithium ion secondary battery to a predetermined overdischarge region, and
        second control of repeatedly performing, in the predetermined overdischarge region,
            a voltage increase of increasing a voltage across the lithium ion secondary battery due to a stop of the discharging, and
            a pulse discharge of discharging the lithium ion secondary battery while oscillating a discharge current.

2. The battery system according to claim 1, wherein the second control is performed in a range in which the voltage across the lithium ion secondary battery does not fall below a predetermined lower-limit voltage.

3. The battery system according to claim 1, wherein an oscillation frequency of the discharging current in the pulse discharge is 3 kHz to 20 kHz.

4. The battery system according to claim 1, wherein the capacity recovery control is performed under a condition that a temperature of the lithium ion secondary battery is 40° C. to 80° C.

5. The battery system according to claim 1, wherein the predetermined overdischarge region is a region in which a state of charge (SOC) of the lithium ion secondary battery is 0% or less.

6. A capacity recovery method for a lithium ion secondary battery,
    the lithium ion secondary battery including a positive-electrode active material layer and a negative-electrode active material layer disposed with a separator therebetween,
    the negative-electrode active material layer including
        a facing portion that faces the positive-electrode active material layer, and
        a non-facing portion that does not face the positive-electrode active material layer,
    the capacity recovery method comprising:
    discharging the lithium ion secondary battery to a predetermined overdischarge region; and
    repeatedly performing, in the predetermined overdischarge region,
        a voltage increase of increasing a voltage across the lithium ion secondary battery due to a stop of the discharging, and
        a pulse discharge of discharging the lithium ion secondary battery while oscillating a discharge current.

* * * * *